United States Patent
Lamprecht et al.

(10) Patent No.: US 10,395,532 B2
(45) Date of Patent: Aug. 27, 2019

(54) METHOD FOR OPERATING A VEHICLE, AND MOTOR VEHICLE

(71) Applicant: Audi AG, Ingolstadt (DE)

(72) Inventors: Andreas Lamprecht, Neuburg (DE); Dominik Goby, Gerolfing (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 15/303,539

(22) PCT Filed: May 31, 2016

(86) PCT No.: PCT/EP2016/000891
§ 371 (c)(1),
(2) Date: Oct. 12, 2016

(87) PCT Pub. No.: WO2016/192850
PCT Pub. Date: Dec. 8, 2016

(65) Prior Publication Data
US 2017/0148321 A1    May 25, 2017

(30) Foreign Application Priority Data
Jun. 2, 2015    (DE) .................. 10 2015 007 020

(51) Int. Cl.
  G08G 1/0967    (2006.01)
  G01C 21/34     (2006.01)
  G01C 21/36     (2006.01)

(52) U.S. Cl.
  CPC ... G08G 1/096775 (2013.01); G01C 21/3492 (2013.01); G01C 21/3691 (2013.01);
(Continued)

(58) Field of Classification Search
None
See application file for complete search history.

(56) References Cited

U.S. PATENT DOCUMENTS 6,867,688 B2 *  3/2005  Lamb .................. G08B 27/006
                                                340/286.02
9,372,739 B2 *  6/2016  Beardsmore ............ G06F 9/542
(Continued)

FOREIGN PATENT DOCUMENTS

DE    102008015232 A1    5/2009
DE    102013106669 A1    1/2014
WO    WO 2014/114751 A1  7/2014

OTHER PUBLICATIONS

Ilias Leontiadis et al.: "Opportunistic Spatio-Temporal Dissemination System for Vehicular Network," *MobiOpp* '07. Jun. 11, 2007; 8 pages.
(Continued)

*Primary Examiner* — Shelley Chen
(74) *Attorney, Agent, or Firm* — Sterne, Kessler, Goldstein & Fox P.L.L.C.

(57) ABSTRACT

The invention relates to a method for operating a vehicle, in which a control center transmits at least one piece of information to a receiving device of the vehicle, based on the geographic position of the vehicle. The control center associates the at least one piece of information with a predefined region and publishes the at least one piece of information associated with the predefined region. The vehicle receives the at least one piece of information if a control device of the vehicle has subscribed to receive information which is associated with the predefined region. The invention further relates to a vehicle.

16 Claims, 1 Drawing Sheet

(52) U.S. Cl.
CPC . *G08G 1/096716* (2013.01); *G08G 1/096725* (2013.01); *G08G 1/096741* (2013.01)

(56) References Cited

U.S. PATENT DOCUMENTS

| | | | |
|---|---|---|---|
| 2004/0203919 A1 | 10/2004 | Ross et al. | |
| 2005/0033504 A1* | 2/2005 | Rennels | G08G 1/096716 701/117 |
| 2006/0031076 A1* | 2/2006 | Lei | G06Q 30/02 719/328 |
| 2006/0259542 A1* | 11/2006 | Wu | H04L 43/12 709/202 |
| 2010/0100307 A1 | 4/2010 | Kim | |
| 2010/0191453 A1* | 7/2010 | Cameron | G01C 21/3492 701/533 |
| 2010/0267379 A1 | 10/2010 | Stählin et al. | |
| 2011/0248867 A1 | 10/2011 | Lee et al. | |
| 2012/0078440 A1* | 3/2012 | Oravis | B60R 1/00 701/1 |
| 2012/0143977 A1* | 6/2012 | Miche | H04L 67/12 709/207 |
| 2012/0330546 A1* | 12/2012 | Zhao | G01C 21/3492 701/516 |
| 2014/0019040 A1 | 1/2014 | Hider et al. | |
| 2014/0373124 A1* | 12/2014 | Rubin | H04L 67/28 726/7 |
| 2015/0050623 A1* | 2/2015 | Falash | G09B 9/24 434/38 |
| 2015/0079945 A1* | 3/2015 | Rubin | H04W 12/08 455/411 |
| 2015/0106474 A1* | 4/2015 | MacNeille | H04L 67/322 709/217 |
| 2017/0215064 A1* | 7/2017 | Onishi | H04W 4/70 |

OTHER PUBLICATIONS

International Search Report and Written Opinion directed to related International Patent Application No. PCT/EP2016/000891, dated Jul. 20, 2016, with attached English-language translation; 24 pages.

* cited by examiner

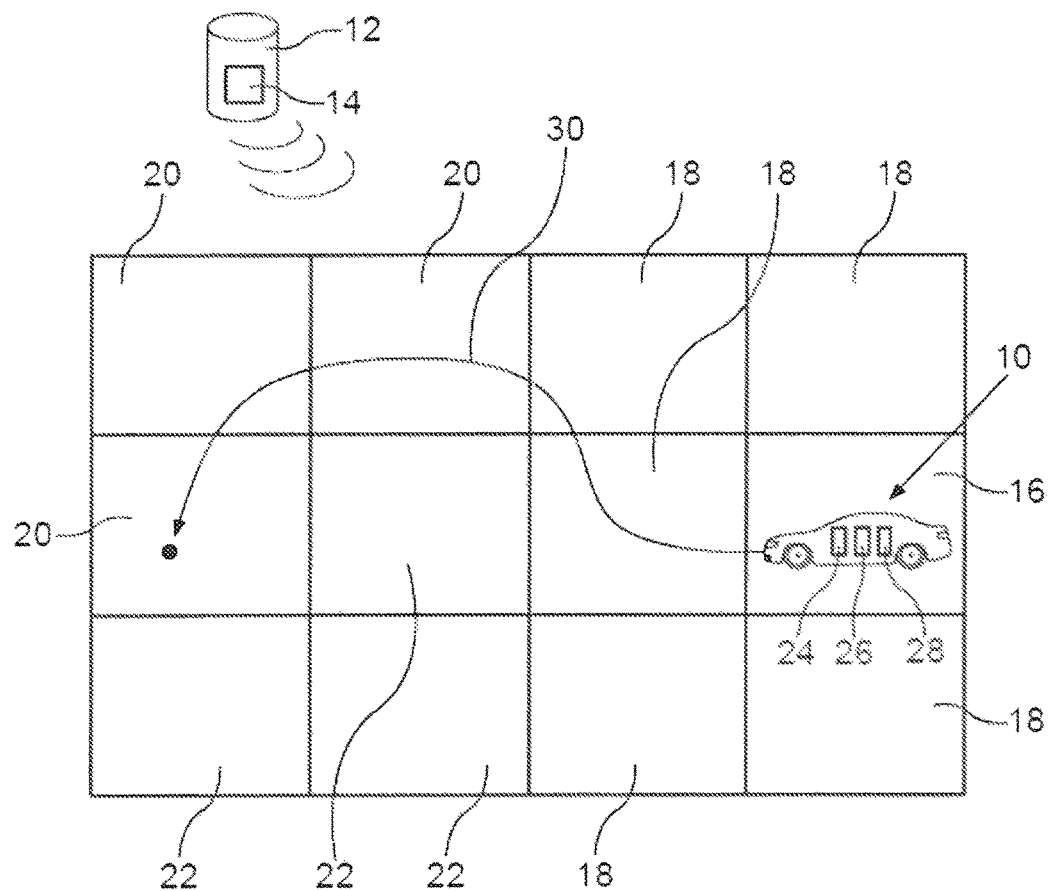

METHOD FOR OPERATING A VEHICLE, AND MOTOR VEHICLE

TECHNICAL FIELD

The invention relates to a method for operating a vehicle, in which a control center transmits at least one piece of information to a receiving device of the vehicle, based on the geographic position of the vehicle. The invention further relates to a vehicle equipped with a receiving device.

BACKGROUND

Increasingly, vehicles are being equipped with Internet-capable control units. These control units enable driver assistance systems to access information about an upcoming route, for example with the help of a navigation system in the vehicle; this information may include speed limits in areas ahead of the vehicle in the direction of travel, tight curves, and the like. However, this type of information is sourced from a database stored locally in the vehicle and must therefore be regarded as static.

In vehicles known from the prior art, current dynamic data are obtained by sending queries at regular intervals to a control center such as a server. The server then responds with the information relevant to the individual vehicle, such as current traffic information regarding traffic movement within a certain radius around the vehicle.

In such communication between a vehicle and a control center such as a server, communication can be initiated by the vehicle, as described above. In this process, however, it is difficult to determine what an optimal query interval might be. Thus there is a trade-off between long query intervals, that is to say, queries with long intervals of time between the individual queries, and short query intervals. Specifically, if queries are sent relatively rarely to the server, new dynamic information is also transmitted with a relatively long delay. If, in contrast, queries are sent at short intervals, query data must be transmitted relatively frequently, even if there is no new information. A great deal of bandwidth is thus required, and wireless resources are wasted.

Alternatively, the vehicle can establish a permanent connection to the server. Such a transmission of vehicle information is described in DE 10 2008 015 232 A1. In this case, an IP link is maintained throughout the entire travel time of the vehicle, and the vehicle transmits its current position to a server at relatively short intervals. Transmitting its position to the server enables the vehicle to subscribe to a warning service. The types of events for which a warning can be issued in this case include, for example, the presence of emergency vehicles, slippery roads, traffic signs, road construction zones, and the like.

Such a maintained connection with the control center or the server, also referred to as the backend server, can also be established via VPN (Virtual Private Network). This enables the vehicle navigation system to report its geographic position or its travel route continuously, or as described in DE 10 2008 015 232 A1, periodically.

However, this leads to problems with respect to the privacy of the vehicle user. The GPS data indicating the geographic position of the vehicle are then known in the backend server at all times. An additional problem involves complexity. Specifically, the backend server is no longer stateless, and must instead update the last location of each vehicle every second. This is because in the transmission of information, only one difference from the information transmitted in response to the previous query is transmitted. As a result, this type of method is relatively costly.

US 2010/0100307 A1 describes a traffic monitoring system in which traffic data are collected by mobile devices within a region. A server then transmits the collected information by means of a "message broker" to a respective mobile device, if the mobile device is in an area in which speed is being monitored.

DE 10 2013 106 669 A1 describes a method for standardizing navigation data. In this case, a processor uses a mobile device to send data to a standardization system. The processor can then process the standardized data and provide navigation instructions.

BRIEF DESCRIPTION OF THE DRAWINGS/FIGURES

FIG. 1 schematically illustrates the transmission of information to a receiving device of a vehicle, the vehicle having subscribed to receive information associated with a predefined region.

DETAILED DESCRIPTION

The object of the present invention is to provide a particularly uncomplicated method of the aforementioned type and a correspondingly operable vehicle.

In the method according to the invention, the control center associates at least one piece of information with a predefined region. The control center publishes the at least one piece of information associated with the predefined region. The vehicle receives the at least one piece of information when a control device of the vehicle has subscribed to receive information associated with the predefined region. Publish/subscribe middleware is therefore used in the control center external to the vehicle, for example a server, also referred to as the backend server. The publish/subscribe middleware (=middleware for publishing/subscribing) is an application which supports a communication protocol that allows publishing of and subscribing to messages or information.

The use of the publish/subscribe middleware enables the control center to make the information available for retrieval, rather than transmitting the information directly to specific recipients. The vehicle that has subscribed to the information associated with the predefined region therefore receives any information made available by the control center. The control device of the vehicle accordingly subscribes to at least one predefined region, and the receiving device receives the information associated with that region. The control center or backend server, in contrast, publishes dynamic, that is to say, current information based on the association of the information with the at least one predefined region.

This ensures a minimal latency or delay between the generation or provision of information by the control center and the delivery of this information by the control center to the receiving device of the vehicle. Moreover, the control center is not required to constantly monitor, in other words track, the geographic position of each vehicle. As a result, the privacy of the vehicle user or driver is also protected.

More specifically, it is sufficient for the geographic position, which can particularly be determined based on GPS data, at the level of the predefined region to be known. But the precise position of the vehicle within the predefined region does not need to be constantly tracked. Nevertheless, the receiving device of the vehicle receives the information associated with the predefined region which the control device of the vehicle has subscribed to receive.

As a further result, any computing operations to be carried out by the control center can be carried out independently of the status or position of the vehicle in question. This is because the control center publishes only the content that is linked to the predefined region in question, that is to say, the information associated with that region. This makes the method particularly economical.

In an advantageous embodiment of the method, the receiving device of the vehicle receives the at least one piece of information as soon as the geographic position of the vehicle enters the predefined region. This ensures that highly dynamic information is available in the vehicle in a timely manner, particularly if the information is relevant to the vehicle or the vehicle user.

It has further proven advantageous for the control device of the vehicle to subscribe to receive information that is associated with at least one additional predefined region that adjoins the predefined region. This allows information associated with surrounding regions, for example, to also be taken into account, for example when the driver is planning a route and wishes to factor in information that is associated with a region adjoining the region. This is particularly useful if the information relates to the traffic situation, the weather, landmarks, rest stops, or the like. This enables improved route planning.

It is further advantageous for the control device of the vehicle to subscribe to receive information associated with the predefined regions through which a route identified by a navigation system of the vehicle runs. This ensures that the information available about said route will be transmitted to the receiving device of the vehicle and can thus be factored in or used by the driver and/or by a driver assistance system.

In a further advantageous embodiment, the receiving device of the vehicle receives information associated with at least one predefined region other than the region in which the vehicle is geographically located. This is preferably the case when information can be more easily received at the geographic position of the vehicle than information can be received in the at least one other predefined region. This allows for consideration, for example, as to whether good, powerful wireless connections exist at the vehicle's geographic position that will allow the receiving device of the vehicle to receive the information, while in the at least one other predefined region, for example, cell tower coverage is more scattered or may even include a dead zone. This enables the vehicle to be supplied particularly effectively with the information to which it has subscribed.

With such a configuration, the receiving device of the vehicle preferably receives the information before the vehicle reaches the other predefined region in which the receipt of information is hampered. This ensures in a particularly simple manner that ample information which is relevant to the respective predefined region is available to the vehicle in good time.

It has further proven advantageous for the information to be categorized thematically by the control center, and for the control device of the vehicle to subscribe to receive information associated with at least one topic. This allows a decision to be made regarding the topics on which information will be available in the vehicle. Particularly relevant information can thereby be distinguished from less relevant information based on the categorization structure. This also allows the information to be particularly easily processed or taken into consideration, for example by a driver assistance system of the vehicle and/or by the vehicle user.

A user of the vehicle may select the at least one topic about which information will be received. This may be specified particularly when setting up the control device. However, a particularly relevant topic, such as the traffic situation or the weather, for example, may also be specifically selected, dependent on the situation.

Additionally or alternatively, the control center may transmit information that is associated with a topic other than the topic subscribed to by the control device of the vehicle to the receiving device of the vehicle. This is useful particularly if the corresponding information is safety relevant and includes a warning of upcoming slippery roads, fog, heavy rain or a natural disaster, for example.

Finally, it has proven advantageous for a message intermediary to publish the at least one piece of information associated with the predefined region in such a way that the at least one piece of information is transmitted to a plurality of vehicles. In this case, the respective control devices have subscribed to receive information associated with the predefined region. Such a message intermediary, or message broker, ensures a well-organized transmission of information or messages to the various vehicles. It also enables information to be prioritized particularly easily.

The vehicle according to the invention is designed to communicate with the control center according to the method of the invention. For this purpose, the vehicle comprises a receiving device which is designed to receive at least one piece of information supplied by the control center, based on the geographic position of the vehicle. A control device of the vehicle is configured to subscribe to receive information associated with a predefined region. The information is associated with the predefined region by the control center and published by the control center.

Such a vehicle ensures the receipt of information in an economical manner, particularly without requiring a constant link to the control center.

The described advantages of the method of the invention and of the preferred embodiments also apply to the method of the invention, and vice versa.

The features and combinations of features mentioned above in the description and the features mentioned below in the description of the figure and/or merely illustrated in the FIGURE may be used not only in the combination indicated in each case but also in other combinations or alone, without going beyond the scope of the invention. The invention is therefore considered to also include and disclose embodiments which are not explicitly shown in the FIGURE or described, but which proceed from separate combinations of features of the described embodiments and which can be produced.

Further advantages, features and details of the invention follow from the claims, the following description of preferred embodiments, and the drawing.

The drawing schematically illustrates the transmission of information to a receiving device of a vehicle, the vehicle having subscribed to receive information associated with a predefined region.

The FIGURE shows components of a system for transmitting highly dynamic events to a vehicle 10. A control center 12 located outside the vehicle 10, for example a server, which may also be referred to as a backend server, supports a publish/subscribe mechanism. For this purpose, a message intermediary 14, also called a message broker, can be installed in the control center 12. The product Message Sight, which is based on the MQTT protocol (MQTT=Message Queue Telemetry Transport) and is sold by IBM, may be used as the message broker 14, for example.

Control center 12, in which publish/subscribe middleware is used, thus publishes information and makes this information available to potential subscribers. However in this case, the information is associated with predefined regions 16, 18, 20, 22, which are illustrated schematically in the FIGURE as tiles. The tiles may be marked in the same way as the OpenStreetMap free world map project, for example. These tiles or regions 16, 18, 20, 22 are therefore preferably fixed, and may have a size of 5 kilometers by 5 kilometers, for example.

Vehicle 10 features a receiving device 24 which receives the information published by control center 12. A control device 26 of vehicle 10 subscribes to dynamic information for certain regions 16, 18, 20, 22. For example, control device 26 of vehicle 10 can subscribe to predefined region 16, in which the geographic position of vehicle 10 is located, that is to say, where vehicle 10 is currently located. In addition, however, control device 26 may also subscribe to information, published by control center 12, which is associated with the predefined regions 18 that adjoin predefined region 16.

It can further be provided that control device 26 subscribes vehicle 10 to regions 18, 20, through which a route 30 which has been defined by means of a navigation system 28 of vehicle 10 extends.

The process of subscribing advantageously requires little bandwidth, that is to say, a low data transfer rate. In addition, it is not necessary for control center 12 to continuously track the position of vehicle 10, in other words the vehicle coordinates detected by means of a GPS receiver of vehicle 10, for example. The computing operations in control center 12 are therefore independent of the position of vehicle 10. Furthermore, the privacy of the driver of vehicle 10 is protected. The publish/subscribe mechanism also enables the respective information to be transmitted to receiving device 24 of vehicle 10 with minimal delay.

Control center 12 preferably thematically categorizes the information made available by the control center 12 to the subscribing vehicle 10 or the plurality of subscribing vehicles 10. Accordingly, control device 26 may also subscribe to desired information, for example on the basis of a categorization structure. In this case, a search query that preferably permits the use of placeholders may particularly be used.

For example, control device 26 of vehicle 10 can subscribe to all predefined regions 16, 18, 20, 22 that overlap at least regionally with a particular city. In this case, all available services or topics may be selected, or the subscription may be limited to certain topics. For example, control device 26 of vehicle 10 may subscribe to all services or topics for the regions 16, 18, 20, 22 of a city, such as Ingolstadt. The subscription could then read: "Subscribe to Ingolstadt, all services". Alternatively, the subscription could read: "Subscribe to Ingolstadt, topic traffic signs". Control device 26 can thus determine the scope of the topics or services for which it would like to receive updates transmitted by control center 12. However, such services, topics, or types of events may also be selected by a user of vehicle 10, for example by the driver.

In addition, the geographic extent of the subscription can be determined by control device 26 based on the association of the information with the predefined regions 16, 18, 20, 22.

When certain dynamic information, for example information or a message containing an update, is to be transmitted by control center 12 to receiving device 24 of vehicle 10, control center 12 can first carry out a corresponding publish mechanism to the predefined region 16, 18, 20, 22. Control center 12 thus publishes the information associated with the respective predefined region 16, 18, 20, 22. The vehicles 10, the control devices 26 of which have subscribed to this predefined region 16, 18, 20, 22, then receive the information directly, that is to say, delivered with minimal latency.

The invention claimed is:

1. A method for operating a vehicle, comprising:
 receiving a subscription from a control device of the vehicle for information associated with a predefined region, wherein the information includes at least one piece of information;
 associating, by a control center, the at least one piece of information with the predefined region; and
 publishing, by the control center using a publish/subscribe middleware, the at least one piece of information associated with the predefined region based on a geographic position of the vehicle, wherein publishing the at least one piece of information makes the at least one piece of information available for retrieval by one or more receiving devices associated with vehicles that have subscribed to receive information,
 wherein the publish/subscribe middleware supports a communication protocol that allows publishing of and subscribing to messages or the information, and
 wherein the publish/subscribe middleware is external to the vehicle,
 thereby enabling the control center to make the at least one piece of information available for retrieval rather than transmitting the at least one piece of information directly to the one or more receiving devices.

2. The method of claim 1, wherein the one or more receiving devices receive the at least one piece of information after the geographic position of the vehicle enters the predefined region.

3. The method of claim 1, wherein the control device of the vehicle subscribes to receive information associated with at least one additional region that adjoins the predefined region.

4. The method of claim 1, wherein the control device of the vehicle subscribes to receive information associated with predefined regions through which a route designated by a navigation system of the vehicle extends.

5. The method of claim 1, wherein the one or more receiving devices receive the at least one piece of information associated with the predefined region when the geographic position of the vehicle is located outside the predefined region based on a strength of wireless coverage in the predefined region.

6. The method of claim 1, wherein the at least one piece of information is categorized thematically by the control center, and the control device of the vehicle subscribes to a receive information associated with at least one topic.

7. The method of claim 6, wherein the at least one topic is selectable by a user of the vehicle.

8. The method of claim 6, further comprising:
 transmitting to the one or more receiving devices, by the control center, information that is associated with a topic other than the at least one topic to which the control device of the vehicle has subscribed.

9. The method of claim 1, wherein the publishing the at least one piece of information further comprises:
 publishing, by a message broker implemented in the publish/subscribe middleware at the control center, the at least one piece of information associated with the predefined region in such a way that the at least one piece of information is transmitted to a plurality of vehicles that have subscribed to receive the information associated with the predefined region, wherein publishing is independent of a status or a position of the vehicle.

10. A vehicle comprising:
a receiver configured to receive at least one piece of information that is published by a control center based on a geographic position of the vehicle; and
a controller configured to subscribe to receive information associated with a predefined region, the information associated with the predefined region having been associated with the predefined region by the control center and published by the control center using a publish/subscribe middleware,
wherein publishing the at least one piece of information makes the at least one piece of information available for retrieval by one or more receiving devices associated with vehicles that have subscribed to receive information,
wherein the publish/subscribe middleware supports a communication protocol that allows publishing of messages or the information associated with the predefined region and subscribing to the messages or the information by the one or more receiving devices, and
wherein the publish/subscribe middleware is external to the vehicle,
thereby enabling the control center to make the at least one piece of information available for retrieval rather than transmitting the at least one piece of information directly to the one or more receiving devices.

11. The vehicle of claim 10, wherein the receiver receives the at least one piece of information after the controller subscribes to receive the information associated with the predefined region.

12. The vehicle of claim 10, wherein the receiver is configured to receive the at least one piece of information after the geographic position of the vehicle enters the predefined region.

13. The vehicle of claim 10, wherein the controller is further configured to subscribe to receive information associated with at least one additional region that adjoins the predefined region.

14. The vehicle of claim 10, wherein the controller is further configured to subscribe to receive information associated with predefined regions through which a route designated by a navigation system of the vehicle extends.

15. The vehicle of claim 10, wherein the receiver is further configured to receive the at least one piece of information associated with the predefined region when the geographic position of the vehicle is located outside the predefined region based on a strength of wireless coverage in the predefined region.

16. The vehicle of claim 10, wherein the at least one piece of information is categorized thematically by the control center.

* * * * *